United States Patent Office 2,751,043
Patented June 19, 1956

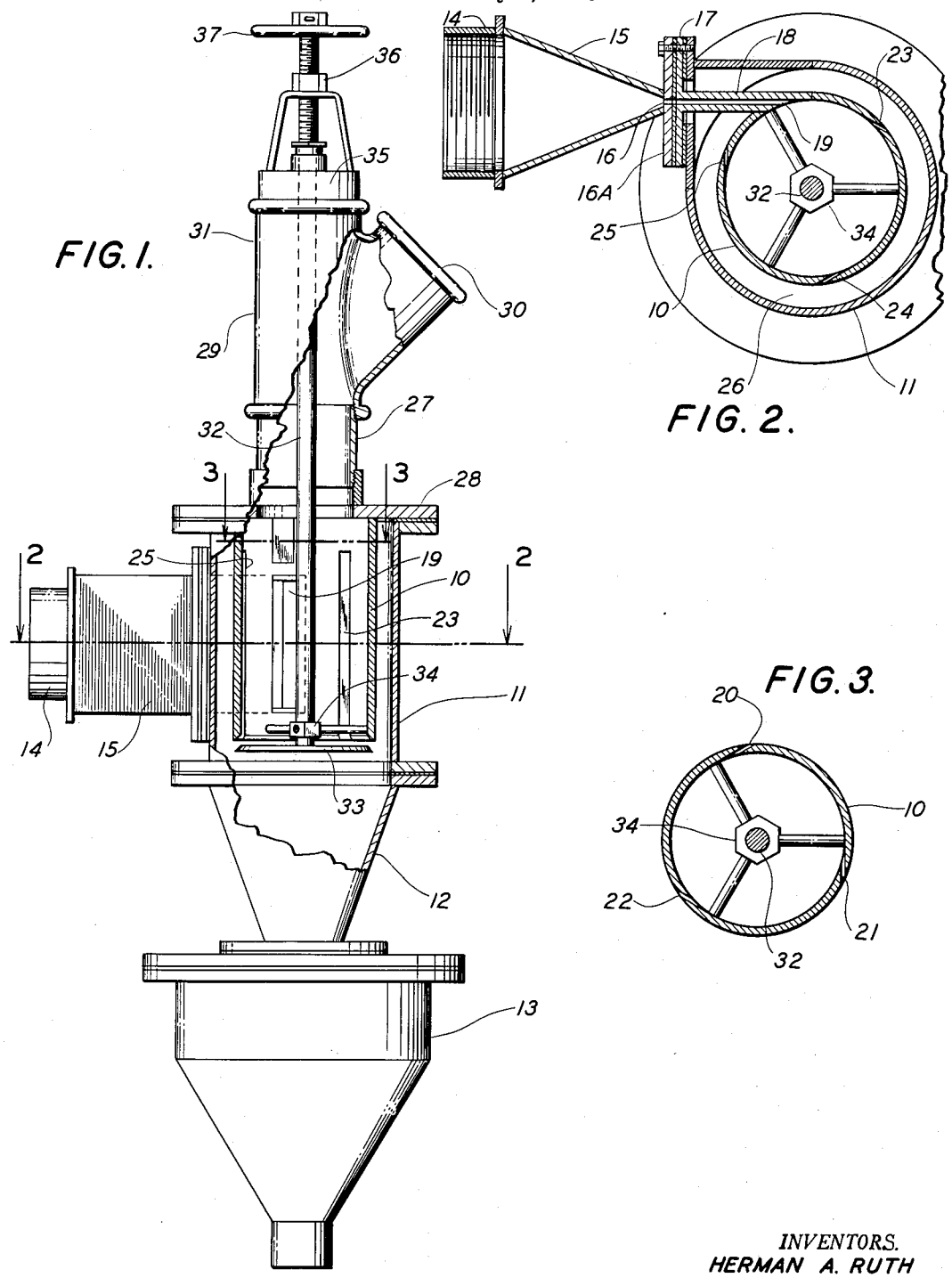

2,751,043

SEPARATION OF SUSPENDED SOLIDS FROM FLUIDS

Herman A. Ruth and Merrill W. MacAfee, Los Angeles, Calif., assignors to Pacific Foundry Company, Ltd., San Francisco, Calif., a corporation of California Application July 6, 1953, Serial No. 366,118

2 Claims. (Cl. 183—85)

This invention is concerned with the separation of suspended finely divided solids from a moving fluid stream and although applicable to the separation of suspended solids from liquids, finds its principal application in the recovery of dust from a moving gas stream. The invention provides new and improved apparatus for separating solids from fluids, and in its preferred form provides an improved centrifugal dust collector of high efficiency, low pressure loss, that is capable of being adjusted to optimum conditions for the particular mixture of dust and gas to be treated.

It is common to throw suspended solids out of a moving gas stream by centrifugal action and a great number of cyclone type dust collectors have been developed. However, many of these collectors are bulky, require excessive power due to the high resistance that they offer, and do not have a high efficiency in terms of the proportion of total dust removed. Moreover, in practically all instances it is difficult, if not impossible, to adjust the collector to provide optimum removal conditions for the particular mixture of dust and gas undergoing treatment.

Most dust collectors comprise a conical or frusto-conical housing. The gas stream is introduced tangentially into the wider portion of the housing and the gas swirls in a spiral path of decreasing radius toward the narrow portion of the housing. As the gas swirls, heavy solids are thrown out of it against the housing and when the gases reach the narrow part of the housing, the direction of gas flow is reversed so that it whirls in an inner spiral to an exit near the wider portion of the housing.

To aid in collection it has been common to place baffles of various types in a housing, but in many instances these baffles actually interfere with dust collection by causing turbulence and reentrainment of removed dust. Moreover, the construction of the collector frequently establishes conditions which are satisfactory for one type of gas-dust mixture but are invariant and entirely unsatisfactory for another gas mixture.

The dust collector of our invention avoids many of the foregoing difficulties and provides a relatively quiescent zone into which the separated dust passes continuously, so that the possibilities of reentrainment are minimized. Moreover, in its preferred form the collector of our invention may be adjusted very simply to provide optimum conditions for a particular mixture of dust and gas being treated.

The dust collector of our invention involves the use of a tube having a curved wall, preferably a tube of uniform central section throughout its length. The fluid containing the solids to be separated is introduced tangentially into the tube through an inlet conduit so that swirling takes place inside the tube around its axis. Preferably the inlet into the tube is a long, narrow slit extending in a direction of the tube axis for a substantial portion of the tube length. The swirling gas stream throws its solids to the tube wall into the mouth of one or more tangential exit conduits which pass through the tube wall. Preferably these exit conduits are narrow slits extending in the direction of the tube axis and elongated in that direction. The gas from which the solids have been thrown out leaves the collector from one end of the tube. The separated dust together with some of the gas passes through the exit slits in the tube into a relatively quiescent annular zone defined by a housing where the dust drops out. The gas which accompanies this dust is permitted to reenter the tube through the end opposite the principal gas exit.

In the preferred form of our apparatus valving means is provided at the end of the tube through which the gas re-enters. Our preferred form of valve comprises a baffle disposed near the tube end and extending transversely to the tube axis with means for adjusting the space between the baffle and the tube. When the valve is closed, a pressure builds up in the housing and inhibits the entrance of the dust and gas into the exit slit. As the valve is opened, the pressure within the housing is reduced so that the dust is carried through the exit slit into the quiescent zone. If the valve is opened to an excessive degree, the quiescent zone becomes less so and the conditions for dust collection in the quiescent zone become less favorable. By adjusting the valve opening, optimum conditions are established for the particular mixture of dust and gas being treated and an optimum degree of separation is obtained.

In the preferred form of our apparatus the exit slits extend for substantially the entire length of the tube, although it is not necessary that a single slit extend for the entire length. On the contrary, we prefer to employ exit slits which are offset from each other around the periphery of the tube with one slit extending to one tube end and the other slit extending to the other tube end.

Although it is not necessary to provide more than one tangential exit slit, a plurality of such slits spaced around the periphery of the tube is desirable. In one preferred form of our device the exit slits are spaced equally around the tube at angles of approximately 120°.

The baffle or valving means which controls the re-entry of gas into the tube is preferably a plate of about the same size as the tube cross section and extending transversely across the tube end. This plate is fastened to a stem that extends through the tube to control means outside the structure. By moving the stem lengthwise in the tube, the space between the tube end and the baffle is adjusted.

The separating tube need not be vertical, since separation depends upon centrifugal action. However, we prefer to mount the tube in an upright position with the gas re-entry at its lower end. Dust thrown through the exit slits of the tube into the quiescent zone is thus enabled to drop downwardly into a hopper while the gas which accompanied this dust passes into the lower end of the tube and upwardly out of the apparatus with the rest of the gas stream.

These and other aspects of our invention will be understood more throughly in the light of the following detailed description which is illustrated by the accompanying drawings in which:

Fig. 1 is an elevation, partly in section, of a preferred form of dust separator of my invention;

Fig. 2 is a section through the apparatus of Fig. 1 taken along the line 2—2; and Fig. 3 is a section through the apparatus of Fig. 1 taken along the line 3—3.

The dust collector illustrated in the drawings has been used with great success in the removal of very fine particles of dust from a hot gas stream containing sulphur vapor as described and claimed in co-pending applications Serial No. 352,534, filed May 1, 1953, and Serial No. 358,008, filed May 28, 1953. However, it is of general utility and may be employed to remove suspended solids from a variety of liquids or gases. The apparatus comprises an upright separating tube 10 of uniform circular cross section throughout its length. The tube is disposed concentrically in a flanged cylindrical housing 11 which rests in an upright position on a flanged inverted frusto-conical conduit 12 that in turn rests on a conventional sealed dust hopper 13. The dusty gas to be treated enters the apparatus through a pipe 14 of cylindrical cross section. This pipe terminates in a connecting conduit 15 which is round at the end where it joins the pipe and tapers to an elongated slotted end 16 which has a mounting flange 16A. This flange is fastened to the flange 17 of a nozzle member 18. This nozzle enters the separator tube tangentially. In cross section the nozzle is narrow and long, opening into the tube through a rectangular slit 19. The dusty gas enters the separator as a narrow ribbon and swirls rapidly around the inside of the tube, the centrifugal action thus induced tending to throw the dust particles against the tube wall and in effect forming a relatively thick dust layer that tends to swirl clockwise (as viewed in Fig. 2) around the inside of the tube.

The separator tube is provided with an upper set of tangential exit slits 20, 21, 22 which extend from the top of the tube down about a quarter of its height. The tube is also provided with another set of tangential exit slits 23, 24, 25 which are offset from the first set and overlap the upper slits at the top and extend clear to the bottom of the tube. The slits of each set are spaced equally around the periphery of the tube, i. e. 120° apart so that in effect the tube is slitted throughout its height. The slits face the whirling gas stream so that the dust layer formed on the inside of the tube tends to slide into the tangential slits and escape through them into a relatively quiescent space 26 between the tube and the housing.

A gas outlet conduit 27 rests on a flange 28 and extends upwardly from the end of the separator tube on the vertical axis of the apparatus. The separator tube is fastened to and hangs from this flange. The exit pipe terminates in a Y-shaped conduit 29 having an upwardly slanted branch 30 through which the gas is discharged. Through the vertical branch 31 of the Y-shaped conduit the valve stem 32 extends on the axis of the apparatus to a round plate or baffle 33 at the bottom of the tube. This valve stem is journaled at its lower end in a 3-armed spider 34 which is fastened inside the lower end of the tube. The upper end of the valve stem passes through a conventional packing or bonnet 35 on the top of the vertical branch of the Y-shaped conduit. The upper end of the valve stem is threaded, passes through a rigidly held nut 36 and terminates in a wheel 37. By twisting the control wheel the valve stem is turned on the thread of the nut and raised or lowered, thus moving the valve plate 33 at the lower end up and down with respect to the lower end of the tube. When the valve stem is in its uppermost position, the valve plate 33 seats in and completely closes the lower end of the tube. When the valve stem is lowered, the valve plate is moved away from the lower end of the tube, opening an adjustable annular gap at the bottom of the tube.

In the operation of the apparatus just described, the dust laden gas stream enters the tube tangentially through the nozzle opening 19 and whirls clockwise in the tube before escaping upward through the branch conduit 29. If the valve is completely closed, the pressure in the space in the housing surrounding the tube is so high that, although the dust is thrown against the tube wall, very little escapes through the exit slits. If the valve stem is lowered to open the gap between the valve plate and the lower end of the tube, the gas in the housing can escape through this gap and enter the tube, thus reducing the pressure in the annular space surrounding the tube and permitting some gas and the dust thrown out in the tube to pass through the exit slits into the relatively quiescent space. When the dust enters the quiescent space, a large portion of it drops down into the hopper. The gas which accompanied this dust re-enters the tube at its bottom and passes upward with the rest of the gas out of the apparatus.

By adjusting the space between the tube and the valve plate, the action of the collector may be varied substantially. Thus, if the valve is completely closed, little or no dust will be separated out. As the gap is increased, more and more gas will be permitted to pass through the exit slits up to a point at which the velocity of the gas in the annular space surrounding the tube will be excessive, for dust of a particular particle size. Under these conditions some of the dust may not be dropped or may be reentrained and re-enter the tube along with the re-entering gas. By adjusting the position of the valve plate, optimum separation conditions can be established for any particular dust load. If the proportion of dust carried by the gas stream or the particle size of the dust or the velocity of the gas changes markedly, it is relatively simple to adjust the valve opening to re-establish optimum collection conditions.

The apparatus of the invention is simple and rugged, so that it may be constructed at low cost. As shown in the drawings, the inlet nozzle may be constructed as a separate unit which is easily replaceable in case it becomes excessively worn by the dust stream. The same is true of the separating tube itself.

The apparatus of the invention may be built in various sizes, the proportions illustrated in the drawings being satisfactory but not critical.

The apparatus illustrated in the drawings has been employed in the removal of fine ore dust from a stream of hot furnace gases containing sulphur vapor, as described in the aforementioned co-pending applications. In this case the separating tube had an inside diameter of 6 inches and was 11 inches long. The entrance nozzle for the dust laden stream was ¼ inch wide and the exit slits ⅛ inch wide.

The gas was treated at a temperature of about 1000° F., and the velocity in the entrance nozzle was about 235 feet per second. The dust content of the entering gas was about ½ pound per 1000 cubic feet of gas and the particle size ranged from 1.55 microns to 75 microns. About 99.5% of the total dust was removed.

We claim:

1. In a dust collector, the combination which comprises a tube having a wall curved around its longitudinal axis, an inlet conduit of substantially uniform cross section entering the tube through the wall and substantially tangential thereto and terminating in a slit adjacent the inside of the tube wall and extending for a substantial proportion of the tube length for introducing a stream of fluid containing the dust to be collected into the tube, the slit extending along the tube for a substantial proportion of its length and its width being but a small fraction of the width of the tube so that the stream enters the tube as a thin ribbon immediately adjacent the tube wall and swirls therein immediately adjacent the tube wall, the tube wall having at least one slit which is substantially tangential to the tube wall and which faces the swirling stream and is elongated in the direction of the tube axis, a housing disposed around the tube and spaced therefrom, an extension conduit fastened to and extending from one end of the tube and projecting outside the housing and closed at its outer end, a baffle disposed at the opposite end of the tube and extending transversely across it, a longitudinally movable stem connected at one end to the baffle and projecting through the tube and the extension conduit and through the closed outer end of the extension conduit, means for adjusting the longitudinal position of the stem, and a gas exit conduit connected to the side of the extension conduit outside the housing.

2. In a dust collector, the combination which comprises a housing, a tube disposed in the housing and spaced from the side thereof and projecting from the end thereof, the opposite end of the tube opening into the housing, the tube being curved around its axis and having at least one long tangential slit extending for a substantial proportion of the part of the tube that is within the housing, an inlet conduit passing through the side of the housing and the tube and terminating in a long narrow tangential slit immediately adjacent the interior wall of the housing with the slit in the wall facing the slit at the end of the inlet conduit, the cross section of the inlet conduit being substantially uniform at least throughout that portion of the conduit that is disposed within the housing, the inlet conduit being removably supported on the housing, a movable baffle disposed adjacent the inner open end of the tube and extending across it, a longitudinally movable stem connected to the baffle and extending through the tube to its opposite outer end, means for moving the stem, and a gas outlet conduit connected to the side of the tube outside the housing.

References Cited in the file of this patent

UNITED STATES PATENTS

| | | |
|---|---|---|
| 1,031,862 | Morse | July 9, 1912 |
| 1,267,715 | Tutwiler | May 28, 1918 |
| 1,383,984 | Clark | July 5, 1921 |
| 1,573,135 | Bourne et al. | Feb. 16, 1926 |
| 1,761,627 | Hine | June 3, 1930 |
| 1,870,947 | Drumgold | Aug. 9, 1932 |
| 2,069,483 | Skajaa | Feb. 2, 1937 |
| 2,472,777 | Putney | June 7, 1949 |

FOREIGN PATENTS

| | | |
|---|---|---|
| 21,731 | Great Britain | Nov. 28, 1892 |